(12) United States Patent
Harada et al.

(10) Patent No.: US 8,052,936 B2
(45) Date of Patent: *Nov. 8, 2011

(54) CATALYST-SUPPORTED PARTICULATE FILTER

(75) Inventors: Koichiro Harada, Higashi-Hiroshima (JP); Kenji Suzuki, Higashi-Hiroshima (JP); Kenji Okamoto, Hiroshima (JP); Hiroshi Yamada, Hiroshima (JP); Akihide Tamani, Hiroshima (JP)

(73) Assignee: Mazda Motor Corporation (JP)

( * ) Notice: Subject to any disclaimer, the term of this patent is extended or adjusted under 35 U.S.C. 154(b) by 689 days.

This patent is subject to a terminal disclaimer.

(21) Appl. No.: 12/169,753

(22) Filed: Jul. 9, 2008

(65) Prior Publication Data

US 2009/0041637 A1 Feb. 12, 2009

(30) Foreign Application Priority Data

Aug. 8, 2007 (JP) ................................ 2007-206363

(51) Int. Cl.
*B01D 50/00* (2006.01)
*B01J 23/00* (2006.01)
*B01J 21/00* (2006.01)
*B01J 20/00* (2006.01)

(52) U.S. Cl. ........ 422/177; 422/180; 502/302; 502/303; 502/304; 502/327; 502/332; 502/333; 502/334; 502/339; 502/355; 502/415; 502/439; 502/527.19

(58) Field of Classification Search .......... 502/302–304, 502/327, 332–334, 339, 355, 415, 439, 527.19; 422/177, 180
See application file for complete search history.

(56) References Cited

U.S. PATENT DOCUMENTS

| | | | | | |
|---|---|---|---|---|---|
| 5,462,907 | A | * | 10/1995 | Farrauto et al. | 502/304 |
| 5,491,120 | A | * | 2/1996 | Voss et al. | 502/304 |
| 5,580,535 | A | * | 12/1996 | Hoke et al. | 423/245.3 |
| 5,898,014 | A | * | 4/1999 | Wu et al. | 502/302 |
| 6,153,160 | A | * | 11/2000 | Voss et al. | 423/213.7 |
| 6,248,684 | B1 | * | 6/2001 | Yavuz et al. | 502/66 |
| 6,255,249 | B1 | * | 7/2001 | Voss et al. | 502/263 |
| 6,912,847 | B2 | * | 7/2005 | Deeba | 60/297 |
| 7,078,004 | B2 | * | 7/2006 | Voss et al. | 423/213.5 |
| 7,229,597 | B2 | * | 6/2007 | Patchett et al. | 422/177 |
| 7,506,504 | B2 | * | 3/2009 | Kumar | 60/299 |

(Continued)

FOREIGN PATENT DOCUMENTS

CN 1927459 A 3/2007

(Continued)

OTHER PUBLICATIONS

Extended European Search Report dated Jun. 17, 2009; Application No./ Patent No. 08104892.8-2104 / 2047907.

(Continued)

*Primary Examiner* — Cam N. Nguyen
(74) *Attorney, Agent, or Firm* — Studebaker & Brackett PC; Donald R. Studebaker (57) ABSTRACT

In a particulate filter, a catalyst layer containing Pt-carried activated alumina particles, CeZr-based mixed oxide particles and ZrNd-based mixed oxide particles is formed, the proportion of the total amount of the CeZr-based mixed oxide particles and the ZrNd-based mixed oxide particles in the total amount of the Pt-carried activated alumina particles, the CeZr-based mixed oxide particles and the ZrNd-based mixed oxide particles is 10% to 60% by mass, both inclusive, and the mass ratio of the CeZr-based mixed oxide particles to the ZrNd-based mixed oxide particles is 20/80 to 80/20, both inclusive. This configuration enhances the particulate burning property and the low-temperature exhaust gas conversion efficiency.

6 Claims, 4 Drawing Sheets

U.S. PATENT DOCUMENTS

| | | | | |
|---|---|---|---|---|
| 7,612,011 B2* | 11/2009 | Vanderspurt et al. | | 502/302 |
| 7,618,919 B2* | 11/2009 | Shimazu et al. | | 502/439 |
| 7,625,836 B2* | 12/2009 | Matsueda et al. | | 502/325 |
| 7,673,448 B2* | 3/2010 | Voss et al. | | 60/297 |
| 7,674,744 B2* | 3/2010 | Shiratori et al. | | 502/327 |
| 7,691,778 B2* | 4/2010 | Honda et al. | | 502/326 |
| 7,696,127 B2* | 4/2010 | Urai et al. | | 502/326 |
| 7,722,829 B2* | 5/2010 | Punke et al. | | 422/180 |
| 7,740,817 B2* | 6/2010 | Matsumoto et al. | | 423/213.2 |
| 7,749,472 B2* | 7/2010 | Chen et al. | | 423/213.2 |
| 7,871,452 B2* | 1/2011 | Yamada et al. | | 55/523 |
| 7,871,956 B2* | 1/2011 | Wakita et al. | | 502/304 |
| 7,875,250 B2* | 1/2011 | Nunan | | 422/177 |
| 7,875,572 B2* | 1/2011 | Kikuhara et al. | | 502/302 |
| 7,919,051 B2* | 4/2011 | Li et al. | | 422/171 |
| 2004/0065078 A1 | 4/2004 | Schafer-Sindlinger et al. | | |
| 2005/0119117 A1 | 6/2005 | Yoshida et al. | | |
| 2006/0245985 A1 | 11/2006 | Harada et al. | | |
| 2007/0054800 A1 | 3/2007 | Harada et al. | | |
| 2007/0191219 A1 | 8/2007 | Fujita et al. | | |
| 2007/0196245 A1 | 8/2007 | Fujita et al. | | |
| 2008/0254973 A1 | 10/2008 | Okamoto et al. | | |

FOREIGN PATENT DOCUMENTS

| | | |
|---|---|---|
| EP | 1759763 A | 3/2007 |
| EP | 1810738 A | 7/2007 |
| EP | 1820561 A1 | 8/2007 |
| EP | 1859851 A | 11/2007 |
| EP | 1920835 A | 5/2008 |
| EP | 2022554 A | 2/2009 |
| EP | 2055365 A | 5/2009 |
| EP | 2055366 A | 5/2009 |
| JP | 2006326573 | 12/2006 |
| JP | 2007054713 | 3/2007 |
| JP | 2007056736 | 3/2007 |
| JP | 2007083224 | 4/2007 |
| JP | 1920835 A2 | 5/2008 |
| WO | 2005051523 A1 | 6/2005 |

OTHER PUBLICATIONS

K. Koteswara Rao et al. "Preparataion and characterization of bulk and nano particles . . . ", Materials Letters 54 (2002) pp. 205-210.

P. Thangadurai et al. :"Conductivity behaviour of a cubic/tetragonal phase stabilized", Journal of Physics and Chemistry of Solid, vol. 65 (2004) pp. 1905-1912.

* cited by examiner

CATALYST-SUPPORTED PARTICULATE FILTER

CROSS-REFERENCE TO RELATED APPLICATION

This application claims priority under 35 USC 119 to Japanese Patent Application No. 2007-206363 filed on Aug. 8, 2007, the entire contents of which are incorporated herein by reference.

BACKGROUND OF THE INVENTION (a) Field of the Invention

This invention relates to catalyst-supported particulate filters.

(b) Description of the Related Art

Exhaust gases from diesel engines using fuels containing diesel oil as a main component and exhaust gases from gasoline engines using fuels containing gasoline as a main component to burn them under fuel-lean conditions are known to contain particulates (suspended particulate matters containing carbon particles). To restrain particulates from being exhausted to the atmosphere, a filter for trapping particulates in exhaust gas is disposed in an exhaust gas passage of such an engine. When the amount of particulates deposited on the filter becomes large, this causes deterioration of engine power and fuel efficiency. Therefore, in this case, it is necessary to burn the deposited particulates as appropriate to remove them from the filter.

To effectively burn such deposited particulates (ignite the particulates at relatively low temperature and complete their burning in a short period of time), a catalyst layer containing catalytic metal-carried alumina is formed on the walls of exhaust gas channels in the body of such a filter. Catalytic metal-carried alumina is effective in burning particulates but there have been recently developed catalyst materials for filters capable of more efficiently burning particulates.

For example, Published Japanese Patent Application No. 2006-326573 describes the use of such a catalyst material in a filter. The catalyst material is a material in which a catalytic metal, such as platinum (Pt), is carried on a mixed oxide (composite oxide) containing cerium (Ce), zirconium (Zr) and a rare earth metal R selected from among praseodymium (Pr), neodymium (Nd) and lanthanum (La). The published document also describes that the content of R in the mixed oxide is preferably 2% to 11% by mole, both inclusive. Since such a mixed oxide contains Ce, it has oxygen storage/release capacity so that oxygen released from the mixed oxide contributes to ignition and burning of particulates.

Published Japanese Patent Application No. 2007-54713 describes the use of another catalyst material in a filter. The catalyst material is a material in which a catalytic metal is carried on mixed oxide ZrRO particles containing Zr and a rare earth metal R selected from among ytterbium (Yb), Nd and scandium (Sc) and having an R content of up to 18% by mole and mixed oxide CeMO particles containing Ce and a rare earth metal M selected from among samarium (Sm) and gadolinium (Gd). The ZrRO particles have oxygen ion conductivity to thereby release active oxygen but their oxygen release mechanism is different from that of CeZr-based mixed oxides as disclosed in Published Japanese Patent Application No. 2006-326573.

Specifically, CeZr-based mixed oxides have high oxygen storage capacity and release active oxygen by the valence change of Ce ions. On the other hand, the ZrRO particles have oxygen ion conductivity, i.e., so-called oxygen pumping function, and transport, when having both of high-oxygen concentration sites and low-oxygen concentration sites on the particle surfaces, oxygen ions from high-oxygen concentration sites to low-oxygen concentration sites and then release them as active oxygen.

Therefore, for the ZrRO particles, when a small ignition site causing particulates to burn is formed on their surface and then falls into lack of oxygen, oxygen is transported from other high-oxygen concentration sites. Thus, the burning is continued and the burning region on each particle can be easily extended from the ignition site to the surrounding sites.

Published Japanese Patent Application No. 2007-83224 describes the use of still another catalyst material in a filter. The catalyst material is a material in which a catalytic precious metal is carried on ZrRO having oxygen ion conductivity as stated above and alumina.

SUMMARY OF THE INVENTION

Engine exhaust gas after-treatment systems are required not only to efficiently trap and burn off particulates but also to convert hydrocarbons (HC) and carbon monoxide (CO) in exhaust gas. But, what is particularly required is to enhance its exhaust gas conversion performance when the exhaust gas is at low temperatures. Therefore, generally, a catalyst is disposed in an exhaust gas passage upstream of the position at which a particulate filter is placed, and used to oxidize HC and CO or oxidize NO in exhaust gas into $NO_2$.

In recent years, however, there has been stronger demand than ever before to increase the exhaust gas conversion efficiency. The demand to enhance the performance of such an upstream catalyst has accordingly been severer, which tends to increase the cost and size of the catalyst.

With the foregoing in mind, an object of the present invention is to give a catalyst disposed together with a particulate filter not only the function of promoting the burning of particulates but also the function of converting exhaust gas at low temperatures and thereby reduce the burden of the catalyst even if the catalyst is disposed upstream of the particulate filter.

To attain the above object, in the present invention, a catalyst for a particulate filter is essentially composed of a combination of activated alumina, a CeZr-based mixed oxide and a ZrNd-based mixed oxide in an appropriate ratio.

Specifically, an aspect of the present invention is directed to a catalyst-supported particulate filter in which a catalyst is supported on walls of exhaust gas channels of a filter body capable of trapping particulates exhausted from an engine. In the particulate filter, the catalyst contains a mixture of activated alumina particles carrying a catalytic metal, CeZr-based mixed oxide particles containing Ce and Zr and ZrNd-based mixed oxide particles containing Zr, Nd and a rare earth metal M other than Ce and Nd, the proportion of the total amount of the CeZr-based mixed oxide particles and the ZrNd-based mixed oxide particles in the total amount of the activated alumina particles and the CeZr-based mixed oxide particles and the ZrNd-based mixed oxide particles is 10% to 60% by mass, both inclusive, and the mass ratio of the amount of the CeZr-based mixed oxide particles to the amount of the ZrNd-based mixed oxide particles (the CeZr-based mixed oxide/ZrNd-based mixed oxide mass ratio) is 20/80 to 80/20, both inclusive.

The CeZr-based mixed oxide particles have oxygen storage/release capacity and release active oxygen by the valence change of Ce ions even in an oxygen-rich gas atmosphere. Specifically, it is believed that when oxygen storage components are used in a three-way catalyst repeating oxygen-rich conditions (fuel-lean conditions) and oxygen-lean conditions (fuel-rich conditions), they store oxygen under fuel-lean conditions and release oxygen under fuel-rich conditions. However, oxygen storage components perform oxygen exchange reactions in which even under fuel-lean conditions they release active oxygen from inside the oxide while taking oxygen into inside the oxide (see Published Japanese Patent Application No. 2007-190460 filed in Japan by the Assignee). The ZrNd-based mixed particles have oxygen ion conductivity to transport oxygen ions from high-oxygen concentration sites to low-oxygen concentration sites and then release them as active oxygen. The activated alumina particles carrying a catalytic metal are effective in burning particulates and act to oxidize HC and CO and oxidize NO into $NO_2$.

Therefore, active oxygen released from the ZrNd-based mixed oxide particles is effectively used for the burning of particulates and the CeZr-based mixed oxide particles having a different oxygen release mechanism aid in burning the particulates. Furthermore, the active oxygen release capacity of the ZrNd-based mixed oxide particles and CeZr-based mixed oxide particles effectively aids the catalytic metal carried on the activated alumina particles to oxidize HC and CO in exhaust gas and oxidize NO into $NO_2$, heat produced by oxidation reaction of these exhaust gas components promotes the burning of the particulates, and produced $NO_2$ serves as an oxidizing agent for efficiently burning the particulates.

Since in the above aspect of the invention the catalyst contains the activated alumina particles carrying a catalytic metal, the CeZr-based mixed oxide particles and the ZrNd-based mixed oxide particles in a mixed state, the following effects for the burning of particulates can be obtained. Specifically, activated alumina particles are porous and, therefore, have large specific surface areas. Since in the above aspect of the invention activated alumina particles are interposed between CeZr-based mixed oxide particles and ZrNd-based mixed oxide particles, a large number of voids exist inside the catalyst. This improves the flowability of exhaust gas inside the catalyst to facilitate the release of active oxygen from the CeZr-based mixed oxide particles and the ZrNd-based mixed oxide particles. As a result, particulates are more likely to burn. Furthermore, the large specific surface areas of the activated alumina particles, coupled with the above-stated good releasability of active oxygen, promote the reaction of NO→$NO_2$, which more easily causes the burning of particulates due to the action of $NO_2$ as an oxidizing agent.

Furthermore, what is important in the above aspect of the invention is not that the three kinds of catalyst components, i.e., the activated alumina particles carrying a catalytic metal, the CeZr-based mixed oxide particles and the ZrNd-based mixed oxide particles, are simply mixed, but that the proportion of the total amount of the CeZr-based mixed oxide particles and the ZrNd-based mixed oxide particles in the total amount of the above three kinds of catalyst components is 10% to 60% by mass both inclusive and the CeZr-based mixed oxide/ZrNd-based mixed oxide mass ratio is 20/80 to 80/20 both inclusive. Thus, as is evident from the later-described empirical data, unexpected effects of increase in particulate burning rate and decrease in light-off temperature for HC and CO can be obtained.

Preferably, the proportion of the total amount of the CeZr-based mixed oxide particles and the ZrNd-based mixed oxide particles in the total amount of the above three kinds of catalyst components is 20% to 50% by mass, both inclusive, and the CeZr-based mixed oxide/ZrNd-based mixed oxide mass ratio is 40/60 to 60/40, both inclusive.

Examples of the rare earth metal M contained in the ZrNd-based mixed oxide particles include La, Pr, Sm, Gd and Y.

What is preferable in enhancing the particulate burning property is the use of at least one selected from the group consisting of La, Pr and Y. What is particularly preferable is the use of Pr as the rare earth metal M.

What is also preferable in enhancing the particulate burning property is that when the oxide of the rare earth metal M in the ZrNd-based mixed oxide particles is designated by MO, the proportion of the total amount of $Nd_2O_3$ and MO in the total amount of $ZrO_2$, $Nd_2O_3$ and MO is 18% to 30% by mole, both inclusive.

Furthermore, preferably, the CeZr-based mixed oxide particles contain Nd in addition to Ce and Zr.

DETAILED DESCRIPTION OF THE INVENTION

Hereinafter, an embodiment of the present invention will be described with reference to the drawings. Note that the following description of the preferred embodiment is merely illustrative in nature and is not intended to limit the scope, applications and use of the invention.

Figure 1:
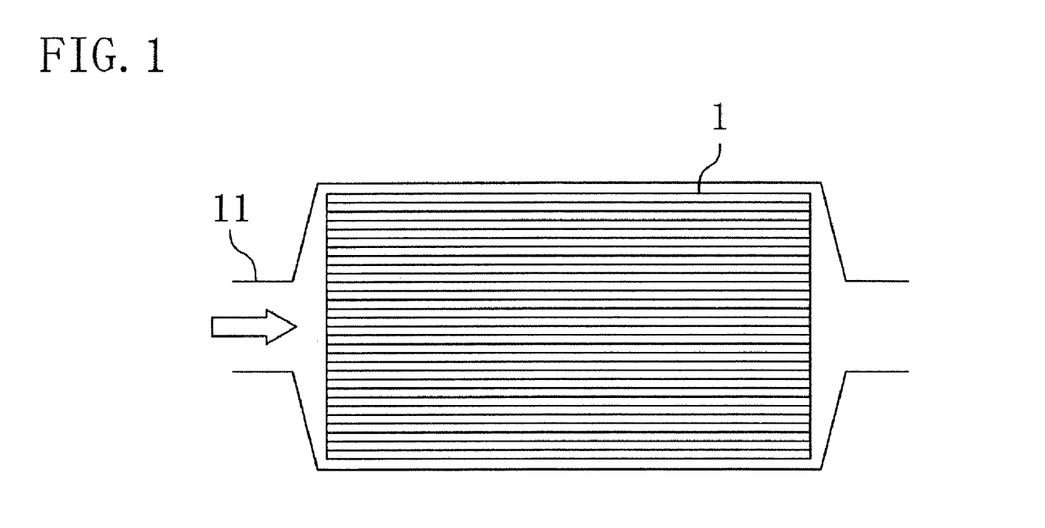
FIG. 1 is a schematic view showing the state that a particulate filter is disposed in an exhaust gas passage of an engine.

In FIG. 1, reference numeral 1 denotes a particulate filter (hereinafter, referred to simply as a "filter") disposed in an exhaust gas passage 11 of an engine. An oxidation catalyst (not shown) can be disposed in the exhaust gas passage 11 upstream of the filter 1 in the flow direction of exhaust gas. Such an oxidation catalyst is obtained by carrying a catalytic metal, such as platinum (Pt) or palladium (Pd), on a support material such as activated alumina. When such an oxidation catalyst is disposed upstream of the filter 1, HC and CO in the exhaust gas are oxidized by the oxidation catalyst and heat of the oxidation combustion increases the temperature of exhaust gas flowing into the filter 1. Furthermore, NO in the exhaust gas is oxidized into $NO_2$ by the oxidation catalyst and produced $NO_2$ is then supplied as an oxidizing agent for burning particulates to the filter 1.

Figure 2:
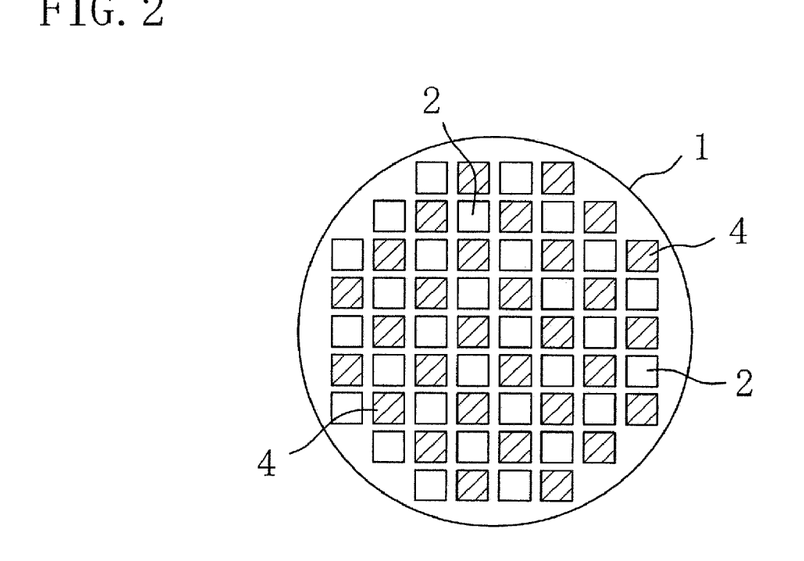
FIG. 2 is a front view schematically showing the particulate filter.
Figure 3:
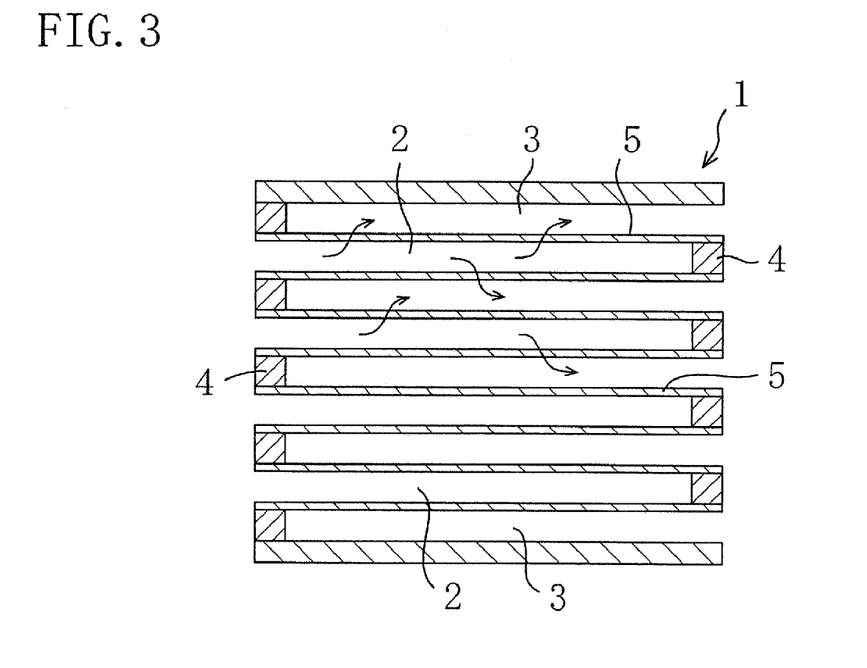
FIG. 3 is a longitudinal cross-sectional view schematically showing the particulate filter.

As schematically shown in FIGS. 2 and 3, the filter 1 has a honeycomb structure in which a large number of exhaust gas channels 2 and 3 run in parallel with each other. Specifically, the filter 1 has a structure in which a plurality of exhaust gas inflow channels 2 and a plurality of exhaust gas outflow channels 3 are alternately arranged vertically and horizontally. Each exhaust gas inflow channel 2 is closed at the downstream end by a plug 4, while each exhaust gas outflow channel 3 is closed at the upstream end by a plug 4. The adjacent exhaust gas inflow and outflow channels 2 and 3 are separated from each other by a thin partition wall 5. In FIG. 2, the hatched parts denote the plugs 4 at the upstream ends of the exhaust gas outflow channels 3.

Figure 4:
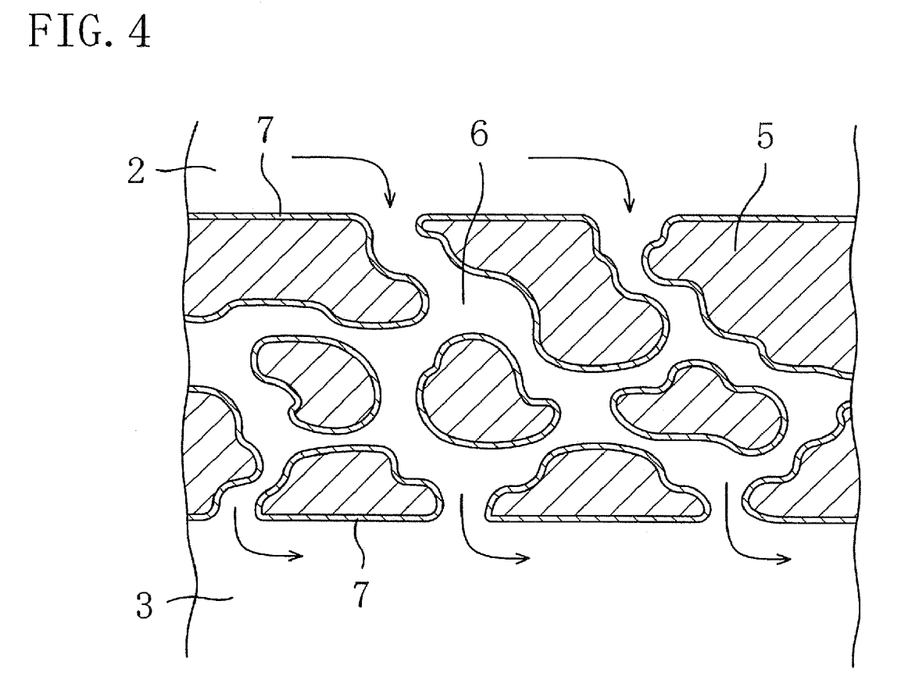
FIG. 4 is an enlarged cross-sectional view schematically showing a wall that separates an exhaust gas inflow channel from an exhaust gas outflow channel in the particulate filter.

The body of the filter 1, inclusive of the partition walls 5, is formed of cordierite or an inorganic porous material, such as SiC, $Si_3N_4$ or sialon. The exhaust gas flowing into each exhaust gas inflow channel 2 flows out through the surrounding partition walls 5 into the adjacent exhaust gas outflow channels 3, as shown in the arrows in FIG. 3. More specifically, as shown in FIG. 4, each partition wall 5 has micro pores (exhaust gas channels) 6 communicating the exhaust gas inflow channel 2 with the adjacent exhaust gas outflow channel 3 so that the exhaust gas flows through the micro pores 6. Particulates are trapped and deposited mainly on the wall surfaces of the exhaust gas inflow channels 2 and the micro pores 6.

A catalyst layer 7 is coated on the walls of all the exhaust gas channels (i.e., exhaust gas inflow channels 2, exhaust gas outflow channels 3 and micro pores 6) in the body of the filter 1. However, it is not necessarily required to form the catalyst layer on the walls of the exhaust gas outflow channels 3.

A feature of the present invention is that the catalyst layer 7 contains activated alumina particles carrying a catalytic metal, CeZr-based mixed oxide particles containing Ce and Zr and ZrNd-based mixed oxide particles containing Zr, Nd and a rare earth metal M other than Ce and Nd.

Figure 5:
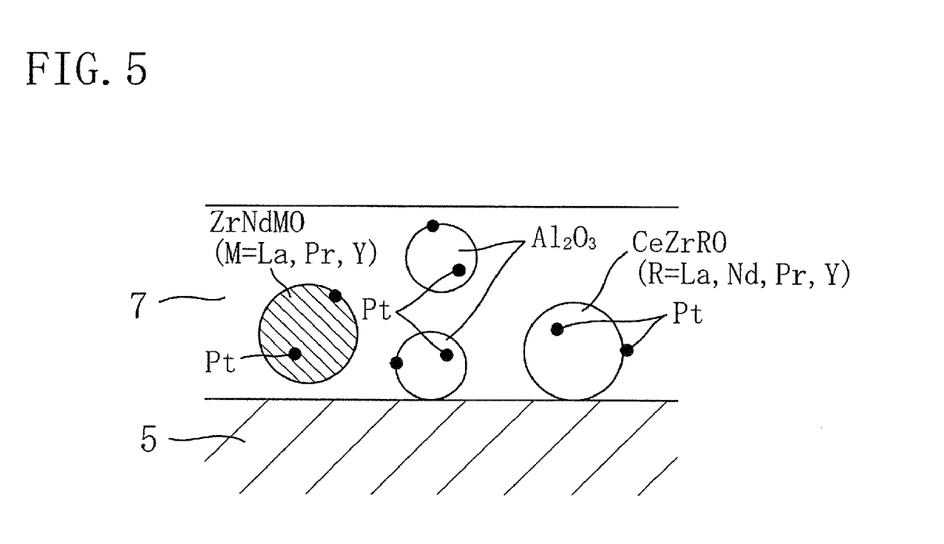
FIG. 5 is a cross-sectional view showing the configuration of a catalyst layer of the particulate filter.

FIG. 5 schematically shows an example of the catalyst layer 7. This example of the catalyst layer 7 contains three kinds of catalyst components in a mixed state. One of the three catalyst components is a catalyst component obtained by carrying Pt as a catalytic metal on activated alumina ($Al_2O_3$) particles. Another of the three catalyst components is a catalyst component obtained by carrying Pt as a catalytic metal on CeZr-based mixed oxide particles (CeZrRO) containing Ce and Zr in major proportions and a rare earth metal R (La, Nd, Pr or yttrium (Y)) other than Ce. The remaining one of the three catalyst components is a catalyst component obtained by carrying Pt as a catalytic metal on ZrNd-based mixed oxide particles (ZrNdMO) containing Zr and Nd in major proportions and a rare earth metal M (La, Pr or Y) other than Ce and Nd. All of the activated alumina particles, the ZrNd-based mixed oxide particles and CeZr-based mixed oxide particles are secondary particles formed by cohesion of primary particles.

A description is given below of a preferred ratio of the above-stated three catalyst components with reference to the following evaluation tests on their carbon burning properties and exhaust gas conversion performances.

<Preparation of Samples>

Prepared were activated alumina powder containing 4% by mass of La, CeZrNd mixed oxide powder having a molar ratio of $CeO_2:ZrO_2:Nd_2O_3=24:72:4$ (where the proportion of $ZrO_2$ is the largest) and ZrNdPr mixed oxide powder having a molar ratio of $ZrO_2:Nd_2O_3:Pr_6O_{11}=70:12:18$ (where the proportion of $ZrO_2$ is the largest). The proportion of ($Nd_2O_3+Pr_6O_{11}$) to ($ZrO_2+Nd_2O_3+Pr_6O_{11}$) in the ZrNdPr mixed oxide powder is 30% by mole.

The three kinds of oxide powders were mixed at various mixing ratios (see Tables 1 and 2), and each oxide powder mixture thus obtained was mixed with a solution of diamminedinitro platinum nitrate and ion-exchanged water, then evaporated to dryness, then well dried and then calcined at 500° C. in the atmospheric environment for two hours, thereby obtaining catalyst materials having different mixed oxide mixing ratios. Each catalyst material was mixed with a binder and ion-exchanged water into a slurry. The slurry was coated on a support for a filter made of silicon carbide (SiC) having a volume of 25 mL, a cell wall thickness of 16 mil ($406.4\times10^{-3}$ mm) and 178 cells per square inch (645.16 $mm^2$), then dried and then calcined by keeping it at 500° C. for two hours in the atmospheric environment, thereby obtaining each sample (catalyst-supported particulate filter). The total amount of the three kinds of mixed oxide powders carried per L of filter was 20 g/L, and the amount of Pt carried per L of filter was 2.0 g/L.

Furthermore, samples (catalyst-supported particulate filters) having different mixed oxide mixing ratios of three kinds of mixed oxide powders (see Tables 3 and 4) were obtained in the same manner using, in place of the ZrNdPr mixed oxide powder having a proportion of ($Nd_2O_3+Pr_6O_{11}$) of 30% by mole, ZrNdPr mixed oxide powder having a molar ratio of $ZrO_2:Nd_2O_3:Pr_6O_{11}=82:12:6$ (i.e., a proportion of ($Nd_2O_3+Pr_6O_{11}$ of 18% by mole).

Each sample was heat aged by keeping it at 800° C. for 24 hours in the atmospheric environment and then subjected to evaluation tests on its carbon burning property and exhaust gas conversion performance.

<Evaluation Test on Carbon Burning Property>

10 mL ion-exchanged water was added to an amount of carbon (carbon black) corresponding to 10 g per L of filter and stirred for five minutes with a stirrer, thereby well dispersing carbon into the water. One end surface of each sample was dipped into the carbon-dispersed water and, concurrently, water in the sample was aspirated from the other end surface with an aspirator. Water having not been removed by the aspiration was removed by air blow from the one end surface and the sample was then put in a dry oven and dried therein by keeping it at 150° C. for two hours. Thus, carbon was deposited on the walls of exhaust gas channels in the sample filter.

The sample was attached to a fixed-bed, simulated gas flow reactor. In this state, simulated exhaust gas (composed of 10% $O_2$, 300 ppm NO, 10% $H_2O$ and $N_2$) was allowed to flow through the sample at a space velocity of 80000/h and, concurrently, the gas temperature at the catalyst sample entrance was increased at a rate of 15° C./min. Then, the carbon burning rate at the time when the gas temperature reaches 590° C. was measured. In this case, the carbon burning rate was calculated based on the amounts of CO and $CO_2$ produced by carbon burning and according to the following equation.

Carbon burning rate (g/h)={gas flow rate (L/h)×[CO and $CO_2$ concentration (ppm)/1×10$^6$]}/22.4×12

<Evaluation Test on Exhaust Gas Conversion Performance>

Each sample was attached to a fixed-bed, simulated gas flow reactor. In this state, simulated exhaust gas (composed of 200 ppmC HC, 400 ppm CO, 100 ppm NO, 10% $O_2$, 4.5% $CO_2$, 10% $H_2O$ and $N_2$) was allowed to flow through the sample at a space velocity of 50000/h and, concurrently, the gas temperature at the catalyst sample entrance was increased at a rate of 30° C./min. Then, the gas temperature at the catalyst sample entrance when the conversion efficiency of each of HC and CO reaches 50% (light-off temperature) was measured.

Test Results>

Table 1 shows carbon burning rates of the samples using ZrNdPr mixed oxide powder having a proportion of ($Nd_2O_3+Pr_6O_{11}$) of 30% by mole and Table 2 shows light-off temperatures of the same samples. Table 3 shows carbon burning rates of the samples using ZrNdPr mixed oxide powder having a proportion of ($Nd_2O_3+Pr_6O_{11}$) of 18% by mole and Table 4 shows light-off temperatures of the same samples.

TABLE 1

Carbon burning rate (g/h, at 590° C.)

|  |  | \(CeZrNd mixed oxide/ZrNdPr mixed oxide\) mass ratio | | | | | | | | |
|---|---|---|---|---|---|---|---|---|---|---|
|  |  | 10/90 | 20/80 | 30/70 | 40/60 | 50/50 | 60/40 | 70/30 | 80/20 | 90/10 |
| Proportion of | 5 | — | 0.72 | 0.72 | — | 0.75 | — | 0.72 | 0.70 | — |
| (CeZrNd mixed oxide + | 10 | 0.71 | 0.76 | — | 0.78 | — | 0.75 | — | 0.76 | 0.74 |
| ZrNdPr mixed oxide) | 20 | 0.73 | — | 0.77 | 0.83 | 0.83 | 0.84 | 0.76 | — | 0.72 |
| in the total amount of | 30 | — | 0.81 | 0.83 | 0.85 | 0.89 | 0.82 | 0.80 | 0.77 | — |
| three kinds of mixed oxides | 40 | 0.74 | — | 0.80 | 0.83 | 0.86 | 0.84 | 0.79 | — | 0.70 |
| (% by mass) | 50 | 0.71 | 0.75 | — | 0.82 | 0.82 | 0.82 | — | 0.76 | 0.71 |
|  | 60 | — | 0.75 | 0.78 | 0.78 | 0.80 | 0.77 | 0.76 | 0.75 | 0.69 |
|  | 70 | — | 0.71 | — | 0.76 | — | — | 0.73 | — | — |
| Remarks | | Proportion of $(Nd_2O_3 + Pr_6O_{11})$ in ZrNdPr mixed oxide: 30% by mole | | | | | | | | |

TABLE 2

Light-off temperature (° C., Upper-row value: CO, Lower-row value: HC)

|  |  | (CeZrNd mixed oxide/ZrNdPr mixed oxide) mass ratio | | | | | | | | |
|---|---|---|---|---|---|---|---|---|---|---|
|  |  | 10/90 | 20/80 | 30/70 | 40/60 | 50/50 | 60/40 | 70/30 | 80/20 | 90/10 |
| Proportion of | 5 | — | 210 | 210 | — | 201 | — | 204 | 210 | — |
| (CeZrNd mixed oxide + |  | — | 220 | 218 | — | 211 | — | 212 | 216 | — |
| ZrNdPr mixed oxide) | 10 | 211 | 204 | — | 202 | — | 204 | — | 205 | 216 |
| in the total amount of |  | 220 | 212 | — | 209 | — | 210 | — | 210 | 225 |
| three kinds of mixed oxides | 20 | 207 | — | 203 | 196 | 195 | 198 | 199 | — | 212 |
| (% by mass) |  | 214 | — | 212 | 203 | 203 | 205 | 206 | — | 225 |
|  | 30 | — | 202 | 200 | 196 | 185 | 193 | 199 | 201 | — |
|  |  | — | 211 | 210 | 205 | 192 | 200 | 205 | 211 | — |
|  | 40 | 211 | — | 200 | 196 | 192 | 193 | 201 | — | 211 |
|  |  | 219 | — | 209 | 205 | 200 | 201 | 207 | — | 220 |
|  | 50 | 220 | 204 | — | 199 | 197 | 197 | — | 204 | 212 |
|  |  | 228 | 211 | — | 205 | 205 | 205 | — | 211 | 223 |
|  | 60 | — | 204 | 204 | 204 | 198 | 199 | 204 | 204 | 215 |
|  |  | — | 211 | 209 | 209 | 205 | 209 | 210 | 211 | 222 |
|  | 70 | — | 209 | — | 210 | — | — | 218 | — | — |
|  |  | — | 219 | — | 217 | — | — | 228 | — | — |
| Remarks | | Proportion of $(Nd_2O_3 + Pr_6O_{11})$ in ZrNdPr mixed oxide: 30% by mole | | | | | | | | |

TABLE 3

Carbon burning rate (g/h, at 590° C.)

|  |  | (CeZrNd mixed oxide/ZrNdPr mixed oxide) mass ratio | | | | | | | | |
|---|---|---|---|---|---|---|---|---|---|---|
|  |  | 10/90 | 20/80 | 30/70 | 40/60 | 50/50 | 60/40 | 70/30 | 80/20 | 90/10 |
| Proportion of | 5 | — | 0.66 | 0.67 | — | 0.70 | — | 0.68 | 0.65 | — |
| (CeZrNd mixed oxide + | 10 | 0.64 | 0.71 | — | 0.76 | — | 0.71 | — | 0.72 | 0.67 |
| ZrNdPr mixed oxide) | 20 | 0.65 | — | 0.72 | 0.79 | 0.80 | 0.78 | 0.74 | — | 0.68 |
| in the total amount of | 30 | — | 0.77 | 0.78 | 0.80 | 0.84 | 0.78 | 0.76 | 0.71 | — |
| three kinds of mixed oxides | 40 | 0.69 | — | 0.74 | 0.79 | 0.81 | 0.81 | 0.74 | — | 0.68 |
| (% by mass) | 50 | 0.66 | 0.70 | — | 0.78 | 0.79 | 0.78 | — | 0.70 | 0.68 |
|  | 60 | — | 0.71 | 0.72 | 0.73 | 0.75 | 0.74 | 0.72 | 0.72 | 0.62 |
|  | 70 | — | 0.64 | — | 0.71 | — | — | 0.68 | — | — |
| Remarks | | Proportion of $(Nd_2O_3 + Pr_6O_{11})$ in ZrNdPr mixed oxide: 18% by mole | | | | | | | | |

TABLE 4

Light-off temperature (° C., Upper-row value: CO, Lower-row value: HC)

| | | (CeZrNd mixed oxide/ZrNdPr mixed oxide) mass ratio | | | | | | | | |
|---|---|---|---|---|---|---|---|---|---|---|
| | | 10/90 | 20/80 | 30/70 | 40/60 | 50/50 | 60/40 | 70/30 | 80/20 | 90/10 |
| Proportion of (CeZrNd mixed oxide + ZrNdPr mixed oxide) in the total amount of three kinds of mixed oxides (% by mass) | 5 | — | 226 | 224 | — | 218 | — | 223 | 223 | — |
| | | — | 233 | 230 | — | 230 | — | 231 | 234 | — |
| | 10 | 225 | 217 | — | 214 | — | 216 | — | 216 | 226 |
| | | 234 | 222 | — | 221 | — | 222 | — | 223 | 235 |
| | 20 | 221 | — | 213 | 209 | 207 | 210 | 208 | — | 219 |
| | | 229 | — | 220 | 216 | 216 | 216 | 219 | — | 229 |
| | 30 | — | 213 | 210 | 205 | 193 | 205 | 205 | 210 | — |
| | | — | 222 | 220 | 214 | 202 | 212 | 215 | 221 | — |
| | 40 | 224 | — | 208 | 207 | 200 | 205 | 207 | — | 218 |
| | | 233 | — | 215 | 214 | 210 | 214 | 218 | — | 229 |
| | 50 | 225 | 214 | — | 207 | 205 | 209 | — | 209 | 224 |
| | | 233 | 222 | — | 216 | 214 | 216 | — | 220 | 232 |
| | 60 | — | 216 | 216 | 214 | 210 | 210 | 212 | 213 | 224 |
| | | — | 223 | 223 | 222 | 218 | 219 | 220 | 222 | 232 |
| | 70 | — | 223 | — | 222 | — | — | 222 | — | — |
| | | — | 230 | — | 231 | — | — | 233 | — | — |
| Remarks | | Proportion of ($Nd_2O_3 + Pr_6O_{11}$) in ZrNdPr mixed oxide: 18% by mole | | | | | | | | |

Referring to carbon burning rates of samples (using ZrNdPr mixed oxide powder having a proportion of ($Nd_2O_3 + Pr_6O_{11}$) of 30% by mole) in Table 1, as the proportion of the total amount of CeZrPr mixed oxide particles and ZrNdPr mixed oxide particles in the total amount of the three kinds of mixed oxide particles increased, the carbon burning rate gradually increased until a peak in the vicinity of 30% by mass and then gradually decreased. Furthermore, as the mass ratio between both the mixed oxides (CeZrPr mixed oxide/ZrNdPr mixed oxide) increased, the carbon burning rate gradually increased until a peak in the vicinity of a mass ratio of 50/50 and then gradually decreased.

Furthermore, it will be seen that the carbon burning rate was relatively high within the zone enclosed by the medium thick line frame (in which the proportion of the total amount of both the mixed oxide particles was 10 to 60% by mass, both inclusive, and the mass ratio between both the mixed oxide particles was 20/80 to 80/20, both inclusive) and a preferable range of carbon burning rates is within the zone enclosed by the thicker line frame (in which the proportion of the total amount of both the mixed oxide particles was 20 to 50% by mass, both inclusive, and the mass ratio between both the mixed oxide particles was 40/60 to 60/40, both inclusive).

Referring next to light-off temperatures of samples (using ZrNdPr mixed oxide powder having a proportion of ($Nd_2O_3 + Pr_6O_{11}$) of 30% by mole) in Table 2, as the proportion of the total amount of both the mixed oxide particles increased, the light-off temperature gradually decreased until a minimum value in the vicinity of 30% by mass and then gradually increased. Furthermore, as the mass ratio between both the mixed oxides increased, the light-off temperature gradually decreased until a minimum value in the vicinity of a mass ratio of 50/50 and then gradually increased. Furthermore, Table 2 shows that the light-off temperature was relatively low within the zone enclosed by the medium thick line frame and was particularly low within the zone enclosed by the thicker line frame.

It is to be noted that when the proportion of the total amount of both the mixed oxide particles was 70% and the mass ratio between them was 40/60, the carbon burning rate was relatively high as shown in Table 1 but the light-off temperature was not low as shown in Table 2.

Therefore, as can be seen from Tables 1 and 2, in order to meet particulate burning property and exhaust gas conversion performance concurrently, the mixing ratio of the three kinds of mixed oxides is preferably set within the zone enclosed by the medium thick line frame and more preferably set within the zone enclosed by the thicker line frame.

Referring next to Tables 3 and 4 showing evaluation results when the proportion of ($Nd_2O_3 + Pr_6O_{11}$) in ZrNdPr mixed oxide was 18% by mole, also in this case, the carbon burning rate and light-off temperature exhibited similar tendencies to those when the proportion of ($Nd_2O_3 + Pr_6O_{11}$) was 30% by mole (see Tables 1 and 2). As can be seen also from Tables 3 and 4, in order to meet particulate burning property and exhaust gas conversion performance concurrently, the mixing ratio of the three kinds of mixed oxides is preferably set within the zone enclosed by the medium thick line frame and more preferably set within the zone enclosed by the thicker line frame.

<Preferable Composition of ZrNd-Based Mixed Oxide>

To determine a preferable composition of the ZrNd-based mixed oxide, various kinds of mixed oxide powders using La, Pr and Y as the rare earth metal M and having different proportions of $Nd_2O_3$ (% by mole) and different proportions of MO (% by mole) were prepared. Next, Pt was carried on each of the various kinds of mixed oxide powders, thereby preparing various kinds of catalyst materials. Note that the catalyst materials contained neither activated alumina nor CeZr-based mixed oxide.

Each of the obtained catalyst materials was coated, like the previously-stated evaluation tests, on a support (filter body) for a filter made of SiC, then dried and calcined, thereby obtaining a sample. The amount of each ZrNd-based mixed oxide powder carried per L of filter was 50 g/L, and the amount of Pt carried per L of filter was 0.5 g/L. Then, each sample was heat aged by keeping it at 800° C. for 24 hours in the atmospheric environment and then measured in terms of carbon burning rate at 590° C. under the same conditions as in the previous-stated evaluation test and amount of CO produced. The measurement results are shown in Table 5.

TABLE 5

| Sample Number | Nd oxide (% by mole) | M oxide (% by mole) | Type of M | Total amount (% by mole) | Carbon burning rate at 590° C. (g/h) | Produced CO (ppm) |
|---|---|---|---|---|---|---|
| 1 | 12.0 | 0.0 | — | 12.0 | 0.70 | — |
| 2 | 20.0 | 0.0 | — | 20.0 | 0.71 | — |
| 3 | 0.0 | 12.0 | La | 12.0 | 0.68 | — |
| 4 | 0.0 | 12.0 | Pr | 12.0 | 0.69 | — |
| 5 | 6.0 | 6.0 | La | 12.0 | 0.72 | — |
| 6 | 6.0 | 12.0 | La | 18.0 | 0.72 | — |
| 7 | 12.0 | 3.0 | La | 15.0 | 0.74 | — |
| 8 | 12.0 | 6.0 | La | 18.0 | 0.79 | — |
| 9 | 12.0 | 12.0 | La | 24.0 | 0.75 | — |
| 10 | 18.0 | 6.0 | La | 24.0 | 0.78 | — |
| 11 | 18.0 | 12.0 | La | 30.0 | 0.77 | — |
| 12 | 6.0 | 6.0 | Pr | 12.0 | 0.71 | — |
| 13 | 6.0 | 12.0 | Pr | 18.0 | 0.77 | — |
| 14 | 12.0 | 3.0 | Pr | 15.0 | 0.72 | — |
| 15 | 12.0 | 6.0 | Pr | 18.0 | 0.74 | — |
| 16 | 12.0 | 12.0 | Pr | 24.0 | 0.82 | 4 |
| 17 | 12.0 | 18.0 | Pr | 30.0 | 0.87 | 5 |
| 18 | 12.0 | La: 3.0, Pr: 12.0 | La, Pr | 27.0 | 0.87 | 5 |
| 19 | 12.0 | La: 3.0, Pr: 18.0 | La, Pr | 33.0 | 1.10 | 8 |
| 20 | 18.0 | 12.0 | Pr | 30.0 | 0.91 | 8 |
| 21 | 6.0 | 6.0 | Y | 12.0 | 0.72 | — |
| 22 | 12.0 | 3.0 | Y | 15.0 | 0.73 | — |
| 23 | 12.0 | 6.0 | Y | 18.0 | 0.74 | — |
| 24 | 12.0 | 12.0 | Y | 24.0 | 0.77 | — |
| 25 | 18.0 | 12.0 | Y | 30.0 | 0.80 | — |

Table 5 shows that Samples 5, 12 and 21 containing a combination of La, Pr or Y with Nd exhibited higher carbon burning rates than Samples 3 and 4 containing no Nd. Therefore, it is can be said to be preferable that Nd is an essential ingredient. However, in the case where only Nd is used as the rare earth metal M as in Samples 1 and 2, the carbon burning rate did not increase with increasing amount of Nd. Therefore, it can be said to be preferable that Nd is used in combination with La, Pr or Y.

Comparison among the cases where the proportion of MO is low (among Samples 7, 14 and 22 and among Samples 8, 15 and 23) shows that the use of La as M is more advantageous than the use of Pr or Y in increasing the carbon burning rate. On the other hand, comparison among the cases where the proportion of MO is high (between Samples 6 and 13 and among Samples 11, 20 and 25) shows that the use of Pr as M is more advantageous than the use of La or Y in increasing the carbon burning rate.

Furthermore, as the proportion of the total amount of $Nd_2O_3$ and MO increased, the carbon burning rate generally increased, with minor exceptions. However, as seen from the results of Samples 16 to 20, when the above total amount increased and the carbon burning rate increased accordingly, the amount of CO produced due to imperfect combustion of carbon tended to increase. Therefore, although it is advantageous in enhancing the particulate burning property that the proportion of the above total amount is high, it is preferable that the proportion is not more than 30% by mole in order to restrain the increase in the amount of CO produced.

On the other hand, when the proportion of the above total amount reached 18% by mole or more, the carbon burning rate generally became high. Therefore, it can be said to be preferable that the proportion of the above total amount is not less than 18% by mole in enhancing the particulate burning property. Particularly, from the comparison among Samples 6, 8, 13, 15 and 23, it can be said to be preferable to attain a proportion of the above total amount of 18% by mole or more while raising the proportion of $Nd_2O_3$ or $Pr_6O_{11}$.

In Table 5, the ZrNdPr mixed oxide of Sample 17 is a ZrNdPr mixed oxide used for the samples of Tables 1 and 2 and the ZrNdPr mixed oxide of Sample 15 is a ZrNdPr mixed oxide used for the samples of Tables 3 and 4. Comparison in carbon burning rate between Tables 1 and 3 and comparison in light-off temperature between Tables 2 and 4 show that Tables 1 and 2 exhibited better results. This is consistent with the results of carbon burning rates of Samples 17 and 15 in Table 5. It can be said from this that if the other ZrNdM mixed oxides in Table 5 are used for samples for the previously-stated evaluation tests, they also will exhibit such carbon burning property and exhaust gas conversion performance as shown in Tables 1 to 4.

<Carbon Burning Rate of CeZr-Based Mixed Oxide>

Prepared were various kinds of powdered CeZr-based mixed oxides (CeZrRO) containing different kinds and proportions of rare earth metals R. Then, Pt was carried on each of the powdered mixed oxides, thereby preparing various kinds of catalyst materials. Note that the catalyst materials contained neither activated alumina nor ZrNd-based mixed oxide.

Figure 6:
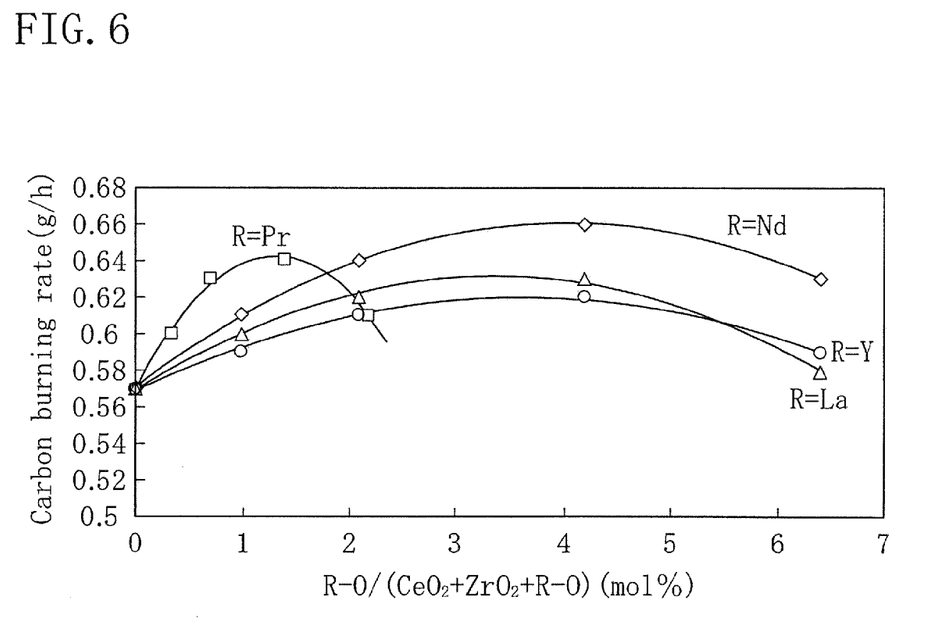
FIG. 6 is a graph showing the relation between carbon burning rate and the proportion of each of various kinds of rare earth metal R oxides in their respective CeZr-based mixed oxides.

Each of the obtained catalyst materials was coated, like the previously-stated evaluation tests, on a support for a filter made of SiC (a filter body having a volume of 25 mL, a cell wall thickness of 12 mil (304.8×10$^{-3}$ mm) and 300 cells per square inch (645.16 mm$^2$), then dried and calcined, thereby obtaining a sample. The amount of each CeZr-based mixed oxide powder carried per L of filter was 50 g/L, and the amount of Pt carried per L of filter was 0.5 g/L. Then, each sample was heat aged by keeping it at 800° C. for 24 hours in the atmospheric environment and then measured in terms of carbon burning rate at 590° C. under the same conditions as in the previous-stated evaluation test. The measurement results are shown in FIG. 6. The abscissa of FIG. 6 represents the proportion (% by mole) of rare earth metal oxide R—O in each CeZr-based mixed oxide.

FIG. 6 shows that when the rare earth metal R was Pr, relatively high carbon burning rates were reached at small proportions of the rare earth metal oxide R—O of 2% by mole or less and that when the rare earth metal R was Nd, La or Y, relatively high carbon burning rates were reached at proportions of the rare earth metal oxide R—O of not more than 6% by mole or not more than 7% by mole. Furthermore, it can be said that, among the four kinds of rare earth metals, the use of Nd is most advantageous in enhancing the carbon burning property.

What is claimed is:

1. A catalyst-supported particulate filter in which a catalyst is supported on walls of exhaust gas channels of a filter body capable of trapping particulates exhausted from an engine, wherein
the catalyst contains a mixture of activated alumina particles carrying a catalytic metal, CeZr-based mixed oxide particles containing Ce and Zr and ZrNd-based mixed oxide particles containing Zr, Nd and a rare earth metal M other than Ce and Nd,
the proportion of the total amount of the CeZr-based mixed oxide particles and the ZrNd-based mixed oxide particles in the total amount of the activated alumina particles and the CeZr-based mixed oxide particles and the ZrNd-based mixed oxide particles is 10% to 60% by mass, both inclusive, and
the mass ratio of the amount of the CeZr-based mixed oxide particles to the amount of the ZrNd-based mixed oxide particles is 20/80 to 80/20, both inclusive.

2. The catalyst-supported particulate filter of claim 1, wherein
the proportion of the total amount of the CeZr-based mixed oxide particles and the ZrNd-based mixed oxide particles in the total amount of the activated alumina particles and the CeZr-based mixed oxide particles and the ZrNd-based mixed oxide particles is 20% to 50% by mass, both inclusive, and
the mass ratio of the amount of the CeZr-based mixed oxide particles to the amount of the ZrNd-based mixed oxide particles is 40/60 to 60/40, both inclusive.

3. The catalyst-supported particulate filter of claim 1, wherein the rare earth metal M contained in the ZrNd-based mixed oxide particles is at least one selected from the group consisting of La, Pr and Y.

4. The catalyst-supported particulate filter of claim 1, wherein when the oxide of the rare earth metal M in the ZrNd-based mixed oxide particles is designated by MO, the proportion of the total amount of $Nd_2O_3$ and MO in the total amount of $ZrO_2$, $Nd_2O_3$ and MO is 18% to 30% by mole, both inclusive.

5. The catalyst-supported particulate filter of claim 1, wherein the CeZr-based mixed oxide particles contain Nd in addition to Ce and Zr.

6. The catalyst-supported particulate filter of claim 1, wherein the ZrNd-based mixed oxide particles contain Pr as the rare earth metal M.

* * * * *